United States Patent
Smith

(10) Patent No.: US 8,320,622 B2
(45) Date of Patent: Nov. 27, 2012

(54) COLOR GRADIENT OBJECT TRACKING

(75) Inventor: Dana S. Smith, Dana Point, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 294 days.

(21) Appl. No.: 12/749,432

(22) Filed: Mar. 29, 2010

(65) Prior Publication Data

US 2011/0235855 A1    Sep. 29, 2011

(51) Int. Cl.
G06K 9/00    (2006.01)
H04N 7/18    (2006.01)

(52) U.S. Cl. .......................... 382/103; 382/291; 348/143

(58) Field of Classification Search ................... 382/100, 382/103, 106–107, 155, 162–168, 173, 181, 382/209, 219, 232, 254, 274, 276, 284, 286–291, 382/305, 312; 250/231.13; 348/143; 345/419
See application file for complete search history.

(56) References Cited

U.S. PATENT DOCUMENTS

| | | | | |
|---|---|---|---|---|
| 6,701,007 | B1 * | 3/2004 | Yamaguchi | 382/162 |
| 6,717,576 | B1 * | 4/2004 | Duluk et al. | 345/419 |
| 7,667,186 | B2 * | 2/2010 | Kauhanen | 250/231.13 |
| 7,859,564 | B2 * | 12/2010 | Kelly et al. | 348/143 |
| 7,907,793 | B1 * | 3/2011 | Sandrew | 382/284 |
| 7,956,889 | B2 * | 6/2011 | Kelly et al. | 348/143 |
| 2005/0263688 | A1 | 12/2005 | Kauhanen | |

FOREIGN PATENT DOCUMENTS

EP    1072028    1/2001

* cited by examiner

*Primary Examiner* — Seyed Azarian
(74) *Attorney, Agent, or Firm* — The Law Office of Gerald Maliszewski; Gerald Maliszewski

(57) ABSTRACT

A system and method are provided for color gradient object tracking. A tracking area is illuminated with a chromatic light source. A color value is measured, defined by at least three attributes, reflected from an object in the tracking area, and analyzed with respect to chromatic light source characteristics. A lookup table (LUT) is accessed that cross-references color values to positions in the tracking area, and in response to accessing the LUT, the object position in the tracking area is determined. The LUT is initially built by illuminating the tracking area with the light source. A test object is inserted into the tracking area in a plurality of determined positions, and the reflected color value is measured at each determined position. The color value measurements are correlated to determined positions. As a result, a color gradient can be measured between a first determined position and a second determined position.

21 Claims, 8 Drawing Sheets

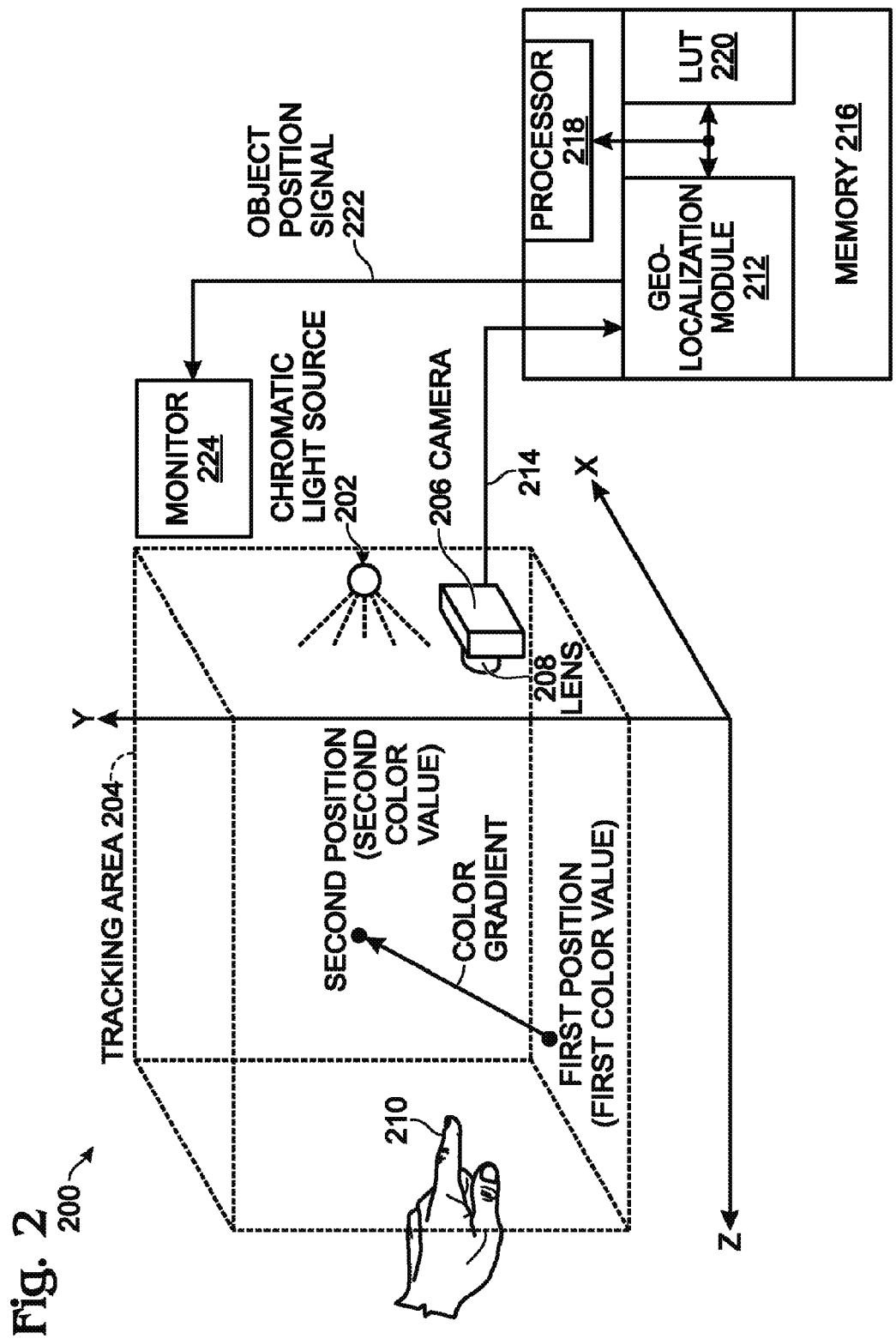

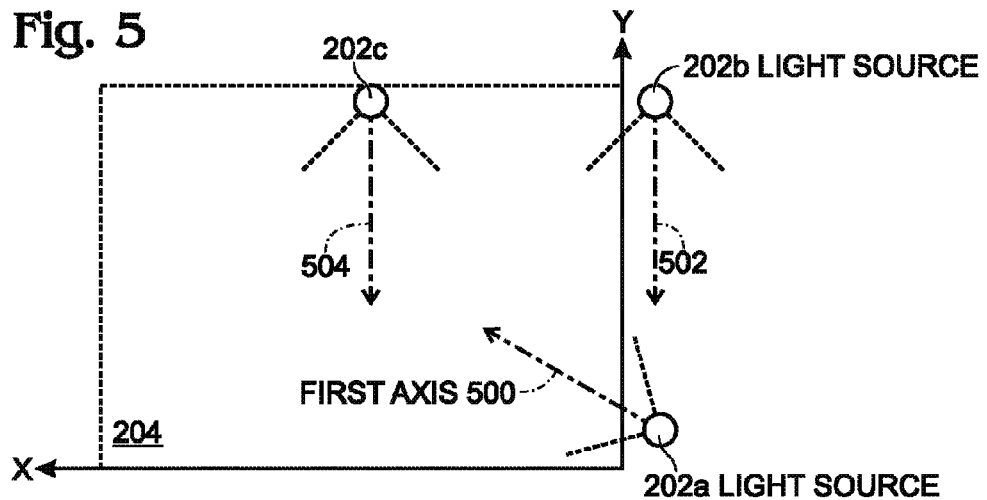
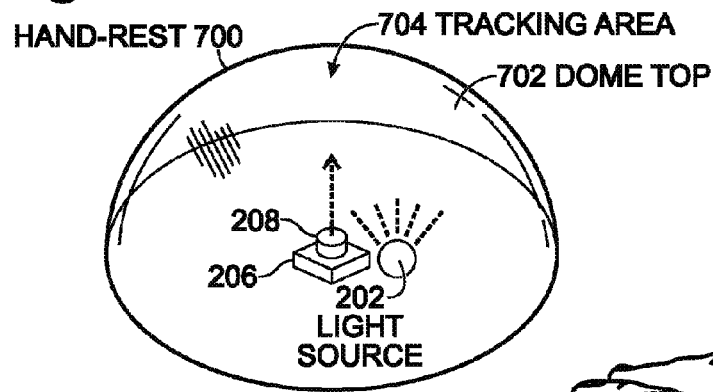
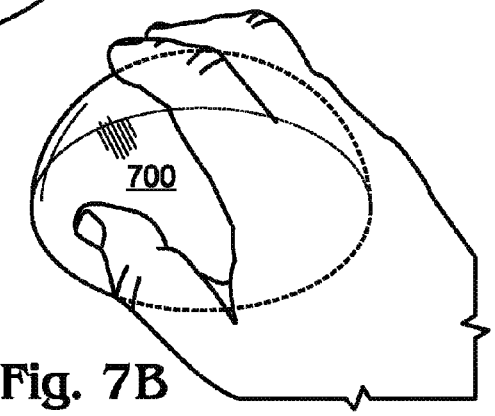

COLOR GRADIENT OBJECT TRACKING

BACKGROUND OF THE INVENTION

1. Field of the Invention

This invention generally relates to machine vision sensing and, more particularly, to a system and method for user interface (UI) object tracking using color gradient measurements.

2. Description of the Related Art

As noted in Wikipedia, the combination of cameras and computers are unable to "see" in the same way as human beings. While people can rely on inference systems and assumptions, computing devices must "see" by examining individual pixels of images, processing the images, and attempting to develop conclusions with the assistance of knowledge bases and features such as pattern recognition engines. Although some machine vision algorithms have been developed to mimic human visual perception, a number of unique processing methods have been developed to process images and identify relevant image features in an effective and consistent manner. Machine vision and computer vision systems are capable of processing images consistently, but computer-based image processing systems are typically designed to perform single, repetitive tasks, and despite significant improvements in the field, no machine vision or computer vision system can yet match some capabilities of human vision in terms of image comprehension, tolerance to lighting variations and image degradation, and parts' variability.

A typical machine or computer vision solution may include several of the following components. Light sources, sometimes very specialized, (e.g., LED illuminators, fluorescent, or halogen lamps) are used to illuminate a field of view. One or more digital or analog cameras (black-and-white or color) are typically required, with suitable optics for acquiring images. A lens may be used to focus on the desired field of view. A camera interface makes the images available for processing. For analog cameras, this includes digitization of the images. A framegrabber is a digitizing device (within a smart camera or as a separate computer card) that converts the output of the camera to digital format (typically a two dimensional array of numbers, corresponding to the luminous intensity level of the corresponding point in the field of view, called pixels) and places the image in computer memory so that it may be processed by the machine vision software.

Data from analog or digital cameras typically requires modification for use in machine vision systems. By use of calibration methods known in the art, corrective values are determined to compensate for differences in response across an array of pixel level detectors.

Additional data is utilized to linearize detector response, to correct for lens distortion, or to construct transforms, tables, and other methods designed to gamut map camera device color representations to other colorspaces.

A processor (often a PC or embedded processor, such as a DSP) processes the digital images, executing software instructions that are part of an image recognition application stored in a computer-readable memory. In some cases, all of the above components are combined within a single device, called a smart camera. Input/output (I/O) communication links (e.g., a network connection or RS-232) report the results. In some aspects, a synchronizing sensor may be used to detect movement, to trigger image acquisition and processing.

The software typically takes several steps to process an image. Often the image is first manipulated to reduce noise or to convert many shades of gray to a simple combination of black and white (binarization). Following the initial simplification, the software may count, measure, and/or identify objects, dimensions or features in the image. Commercial and open source machine vision software packages typically include a number of different image processing techniques. Pixel counting counts the number of light or dark pixels. Thresholding converts an image with gray tones to simply black and white. Segmentation is used to locate and/or count parts. Blob discovery & manipulation inspects an image for discrete blobs of connected pixels (e.g., a black hole in a grey object) as image landmarks. Recognition-by-components is the extraction of geons from visual input. Robust pattern recognition locates an object that may be rotated, partially hidden by another object, or varying in size. Gauging measures object dimensions (e.g., inches). Edge detection finds object edges, and template matching finds, matches, and/or counts specific patterns.

There exists a clear distinction between machine vision and computer vision. Computer vision is more general in its solution of visual problems, whereas machine vision is an engineering discipline mainly concerned with industrial problems.

Gesture recognition is a topic in computer science and language technology with the goal of interpreting human gestures via mathematical algorithms. Gestures can originate from any bodily motion or state but commonly originate from the face or hand. Current focuses in the field include emotion recognition from the face and hand gesture recognition. Many approaches have been made using cameras and computer vision algorithms to interpret sign language. However, the identification and recognition of posture, gait, proxemics, and human behaviors is also the subject of gesture recognition techniques. Gesture recognition can be seen as a way of building a richer bridge between machines and humans than primitive text user interfaces or even GUIs (graphical user interfaces), which still limit the majority of input to keyboard and mouse.

Gesture recognition enables humans to interface with the machine (HMI) and interact naturally without any mechanical devices. Using the concept of gesture recognition, it is possible to point a finger at the computer screen so that the cursor will move accordingly. This could potentially make conventional input devices such as mouse, keyboards and even touch-screens redundant.

Gesture recognition is useful for processing information from humans which is not conveyed through speech or type. As well, there are various types of gestures which can be identified by computers. Just as speech recognition can transcribe speech to text, certain types of gesture recognition software can transcribe the symbols represented through sign language into text. By using proper sensors (accelerometers and gyros) worn on the body of a patient and by reading the values from those sensors, robots can assist in patient rehabilitation.

Pointing gestures have very specific meanings in all human cultures. The use of gesture recognition, to determine where a person is pointing, is useful for identifying the context of statements or instructions. This application is of particular interest in the field of robotics. Controlling a computer through facial gestures is a useful application of gesture recognition for users who may not physically be able to use a mouse or keyboard. Eye tracking in particular may be of use for controlling cursor motion or focusing on elements of a display. Foregoing the traditional keyboard and mouse setup to interact with a computer, strong gesture recognition could allow users to accomplish frequent or common tasks using hand or face gestures to a camera.

Gestures can also be used to control interactions within video games to try and make the game player's experience more interactive or immersive. For systems where the act of finding or acquiring a physical controller could require too much time, gestures can be used as an alternative control mechanism. Controlling secondary devices in a car, or controlling a television set are examples of such usage. In affective computing, gesture recognition is used in the process of identifying emotional expression through computer systems. Through the use of gesture recognition, "remote control with the wave of a hand" of various devices is possible. The signal must not only indicate the desired response, but also which device to be controlled.

Depth-aware or time-of-flight cameras can be used to generate a depth map of what is being seen through the camera at a short range, and this data used to approximate a 3Dd representation. These approximations can be effective for detection of hand gestures due to their short range capabilities. Using two cameras whose position to one another is known (stereo cameras), a 3D representation can be approximated by the output of the cameras.

There are many challenges associated with the accuracy and usefulness of gesture recognition software. For image-based gesture recognition there are limitations on the equipment used and image noise. Images or video may not be under consistent lighting, or in the same location. Items in the background or distinct features of the users may make recognition more difficult. The variety of implementations for image-based gesture recognition may also cause issues for the viability of the technology to general usage. For example, an algorithm calibrated for one camera may not work for a different camera. The amount of background noise also causes tracking and recognition difficulties, especially when occlusions (partial and full) occur. Furthermore, the distance from the camera, and the camera's resolution and quality, also cause variations in recognition accuracy. In order to capture human gestures by visual sensors, robust computer vision methods are also required, for example for hand tracking and hand posture recognition or for capturing movements of the head, facial expressions or gaze direction.

"Gorilla arm" was a side-effect that destroyed vertically-oriented touch-screens as a mainstream input technology despite a promising start in the early 1980s. Designers of touch-menu systems failed to notice that humans aren't designed to hold their arms in front of their faces making small motions. After more than a very few selections, the arm begins to feel sore, cramped, and oversized, while using the touch screen for anything longer than short-term use.

FIG. 1 is a two-dimensional projection depicting three-dimensional color gamuts (prior art). The overall horseshoe shape is a projection of the entire range of possible chromaticities. That is, the projection represents an outer boundary of the range, or gamut, of all colors perceivable by the human visual system. The triangle and its interior represents the visual color gamut producible by a typical computer monitor, which creates color by additively mixing various amounts of red, green, and blue lights, where the intensities of these lights are controlled by red/green/blue (RGB) device signals. The monitor gamut does not fill the entire visual color space. The corners of the triangle are the primary colors for this monitor gamut. In the case of a cathode ray tube (CRT), they depend on the colors of the phosphors of the monitor. The oval shape drawn with dotted lines represents the gamut producible by a device such as a color printer that is controlled by cyan/magenta/yellow (CMY) or cyan/magenta/yellow/black (CMYK) device signals. In the case of a printer, the colors actually produced in response to these signals are dependent upon the colorant properties, the colorant application processes, the viewing illumination, and the print media. For a color output device, its gamut is a certain complete subset of colors that can be accurately represented by the device. The gamut conceptually consists of the set of human-perceivable colors produced by driving the device with all valid combinations of device signals.

Human-perceivable colors that cannot be produced by some particular color output device are said to be out-of-gamut for that device. For example, the pure red of a particular type of CRT or LCD monitor, produced by setting the RGB device signals to (R=max, G=0, B=0) may be out-of-gamut for of a particular type of printer, which may be controlled via CMYK device signals. The converse is also possible. That is, a printer might be able to produce some colors which a monitor cannot produce. While processing a digital image, the most convenient color model used is the RGB model. In practice, the human-perceivable color associated with each image RGB value is often (tacitly or explicitly) assumed to be the color produced by the user's display monitor, or the color obtained by applying formulae of a standardized specification such as sRGB.

A color space may be defined by a number of characteristics or attributes. For example, the gamut of a device may be specified by hue, saturation, or brightness. Thus, a full color gamut must be represented in three dimensions (3D) of attributes. When a device signal vector is presented to an output device, the device produces a CIE (Commission internationale de l'éclairage) color. CIE colors can be denoted by XYZ tristimulus coordinates, or by derived coordinates such as $L^*a^*b^*$ or the like. For example, electrophotographic (EP) color printers use CMYK colorants to produce color, and the device signal vectors are 4-tuples consisting of C, M, Y, K percentage amounts. Allowing these percentages to independently vary through their entire physical range (or within a 'valid' range, considering process limitations) results in a set of colors in CIE color space filling a volume called the color gamut of the device.

In computing, a color gradient specifies a range of position-dependent colors, generally as an alternative to specifying a single color. The colors produced by a gradient vary continuously with position, producing smooth color transitions. A linear color gradient is specified by two points, and a color at each point. The colors along the line through those points are calculated using linear interpolation, then extended perpendicular to that line. Similarly, a real-world chromatic light source may be constructed to project one or more beams in which the color transition within the beam varies continuously with position. Conventionally, "luminance" is used as a measure of intensity per unit area that is measurable by instruments. In color spaces derived from vision models, this measurement is transformed and scaled to behave more like human perception and becomes "lightness". The term "brightness" is usually reserved for a perceptually scaled value.

Increasingly, the methods to control real world devices such as computers and computer-based information systems are attempting to utilize natural human communication modalities. However, there are accuracy limits and confounding problems which limit the success of these control approaches. In addition, hand gesture control provides little feedback to the user, other than the control response from the system dependent on the interface. If that system fails to respond, the user is uninformed as to the causality and may be forced to repeat and modify actions until the desired response is achieved.

It would be advantageous if an improved method existed for tracking objects such as human gestures, for the purpose of creating a more intuitive computer user interface.

It would be advantageous the above-mentioned object tracking method could be improved by using feedback to provide the user with visual cues.

SUMMARY OF THE INVENTION

Increasingly, the methods to control real world devices such as computers and computer-based information systems are attempting to utilize natural human communication modalities. These methods include speech and non-verbal communicators such as gestures. To improve reliability, both in the detection of desired control gestures and in suppression of undesired accidental gesture detection (e.g., motion of the other hand which is accidental to the context of control—the unintended bidder phenomenon), a system and method are presented which introduces a dimensionally-controlled chromatic light source, or a plurality of sources, to illuminate a region within the scene viewed by one or more color cameras. A hue gradient is superimposed onto objects within the camera's field of view and which are also within the chromatically defined region.

In one aspect, the initial approach region illumination is the ambient illumination. It is assumed that no control object (human hand, pointer, or other object to be used) is within the chromatically-modified illumination field. Such objects may be, and are ideally, already in the camera field of view. Images are continuously being captured, and analyzed for content within the specific hues of the chromatic field. Using the image history, it is possible to determine if scene content has changed with regard to the known hues. Increasing levels of hue content are indicative of approach towards the illumination source.

For example, a human finger entering the field of view (tracking area) may initially appear red as a result of an LED located at the proximal end of the field. As the right hand (and finger) moves toward a green light at the distal end of the field (along a z axis), the hue shifts and is proportionally diminished. The relationship of object position relative to the source can be determined based on the hue, chromaticity, or other computed color difference attributes where an original object color is established based on images prior to entry into the modified illumination region. Using multiple sources of varying chromaticity, it is possible to construct an environment where the position of a diffusely-reflective object can be determined in three dimensions. Thus, a red gradient can be followed by a green gradient to indicate advance along the z-axis. Context provided by the prior images and the object dimensionality can be exploited to localize the region of interest and establish trajectory.

Additionally, to the user, the chromatic illumination provides feedback to verify that the object (e.g., the finger of the right hand) is in the region of control. If the left hand is not moving in the illuminated region, it is not considered for gesture contribution analysis. The user may be cued that no left-hand action is included by noting that it is not chromatically illuminated. In a separate use case, an object translating on one axis within a volumetric hue gradient space can be described in three dimensions by hue contours visible along that axis, up to its widest points. If views are available from both ends of the translation axis, then the complete object is describable in three dimensions within the limits imposed by visibility in the respective views.

This invention is an improvement over conventional methods in that it provides a user with cues to interaction, defines a region of control to avoid unintended interaction, and creates additional data for object detection, segmentation, and classification, and noise tolerance improvement over luminance-only based approaches to ranging.

Accordingly, a method is provided for color gradient object tracking, enabled as software instructions stored in a computer-readable medium and executable by a processor. A tracking area is illuminated with a chromatic light source. A color value is measured, defined by at least three attributes, reflected from an object in the tracking area. A lookup table (LUT) is accessed that cross-references color values to positions in the tracking area, and in response to accessing the LUT, the presence of the object in the tracking area is determined.

The LUT is initially built by illuminating the tracking area with the chromatic light source. A test object is inserted into the tracking area in a plurality of determined positions, and the reflected color value is measured at each determined position. The color value measurements are correlated to determined positions. As a result, a color gradient can be measured between a first determined position and a second determined position.

Additional details of the above-described method and a system for color gradient object tracking are provided below.

BRIEF DESCRIPTION OF THE DRAWINGS

FIG. 2 is a schematic block diagram of a system for color gradient object tracking.

FIG. 5 is a schematic block diagram depicting a third variation of the color gradient object tracking system of FIG. 2.

FIGS. 7A and 7B are schematic block diagrams depicting a fifth variation of the color gradient object tracking system of FIG. 2.

DETAILED DESCRIPTION

Figure 1:
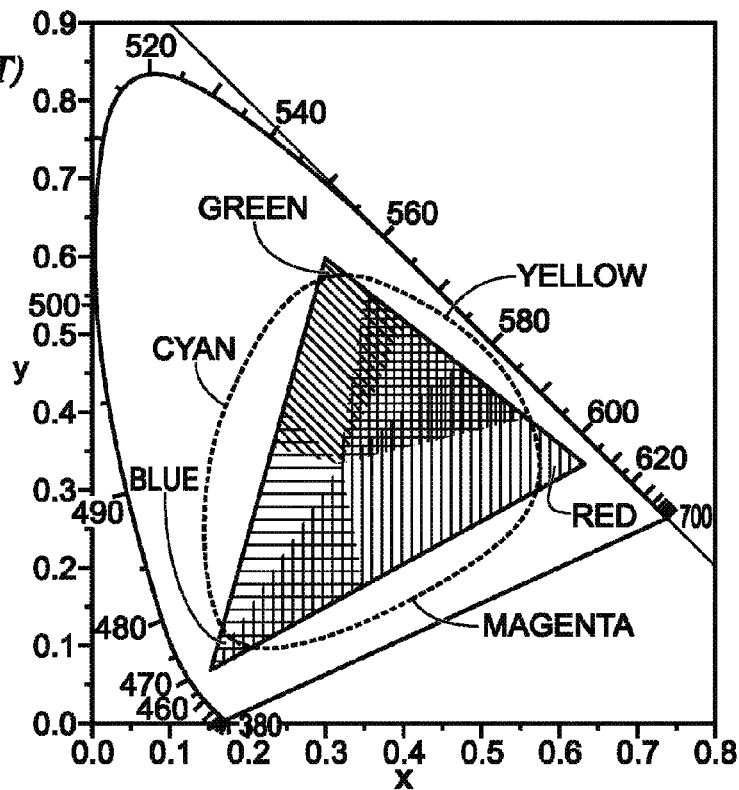
FIG. 1 is a two-dimensional projection depicting three-dimensional color gamuts (prior art).

As used in this application, the terms "component," "module," "system," and the like are intended to refer to a computer-related entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

FIG. 2 is a schematic block diagram of a system for color gradient object tracking. The system 200 comprises a chromatic light source 202 illuminating a tracking area 204. As defined herein, a chromatic light source provides more than one discernable color hue. In one aspect, the chromatic light source provides a full spectrum of visible colors. A camera 206 with a lens 208 is directed into the tracking area 204 to measure a color value, defined by at least three attributes, reflected from an object 210 (e.g., a finger) in the tracking area 204. For example, the three attributes may be hue, lightness, and chroma. Other possible attributes include colorfulness, saturation, brightness, and combinations of the above-mentioned attributes. However, other combinations of attributes are known in the art.

Conventionally, a digital color camera captures an image as RGB intensities, while an image gradient camera captures RGB intensity differences in clusters of pixels. This RGB intensity is a 3-attribute value that is transformed into another 3-attribute representation, one of those being hue, and another being chroma. Those two attributes are sufficient to extract scene information related to an object moving in the scene. Lightness is typically not included because the ambient scene illumination may also vary with position. However, if the illumination is broadband, any color component within it which matches the region of interest will be a noise source, of low level, added to the "signal" introduced into the scene by the illuminator. In one aspect, the camera colorspace is sRGB, and the camera data is transformed to Lch colorspace.

A geolocalization module 212 has an interface on line 214 to receive color measurements from the camera 206. The camera 206 either sends digital frames, or if the camera is analog, the geolocalization module 212 converts the analog images to digital images. The geolocalization module 212 is enabled as software instructions that are stored in a computer-readable memory 216 and executed by processor 218. The processing and manipulation of software instructions are well known art, and details of processor support structures (i.e. a computer) are omitted in the interest of brevity. The geolocalization module 212 accesses a lookup table (LUT) 220 in memory 216, cross-referencing color values to positions in the tracking area. In response to accessing the LUT 220, the geolocalization module 212 determines the presence of the object 210 in the tracking area 204. The geolocalization module 212 has an output on line 222 to supply an object position signal representing the position of the object in the tracking area. In one aspect, object position signals are retrieved from memory 216. Alternately, the geolocalization module 212 supplies an object position real-time feedback signal representing the object presence in the tracking area. As shown, the object position signals are supplied to a monitor to supply feedback to a user. In other variations, the feedback can be auditory, vibratory, or a combination of different stimuli that can be sensed by a human.

The geolocalization module 212 initially calibrates the LUT 220 by illuminating the tracking area with the chromatic light source 202, accepting color measurements for a test object inserted into the tracking area in a plurality of known positions, and correlating color value measurements to the known positions. For example, the geolocalization module 212 accepts a first color value measurement associated with a first known position, and a second color value measurement associated with a second known position, and determines a color value gradient between the first and second positions.

The determination of object presence is the simplest form of object detection. Given a plurality of color value measurements made at a corresponding plurality of locations, multiple color gradients can be calculated. These color gradients permit the determination of additional object characteristics such as object position, object shape, object trajectory, object velocity and combinations of the above-mentioned characteristics.

Figure 3:
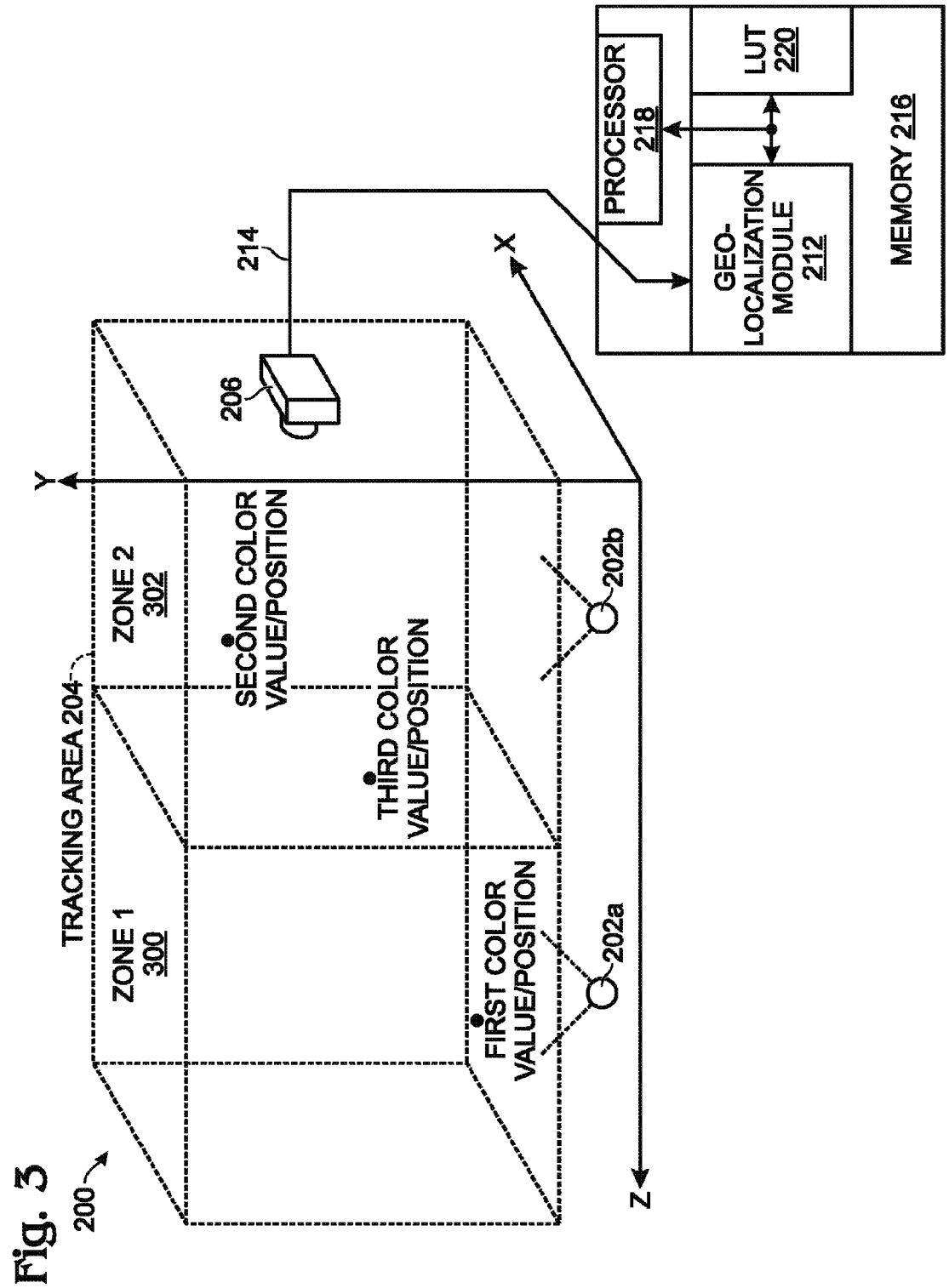
FIG. 3 is a schematic block diagram depicting a first variation of the color gradient object tracking system of FIG. 2.

FIG. 3 is a schematic block diagram depicting a first variation of the color gradient object tracking system of FIG. 2. In this aspect, the chromatic light source is comprised of a plurality of monochromatic light sources, each directed into the tracking area 204. Shown are monochromatic light sources 202a and 202b. Although only two light sources are shown, the system 200 is not limited to any particular number. The light sources may be designed to emit a single hue (monochromatic), or color filters (not shown) may be interposed between broadband light sources and the tracking area as a monochromatic light source. As another alternative, both sources 202a and 202b may be chromatic light sources. However, the use of two chromatic light sources potentially creates the situation where two positions in the tracking area have the same color value. As another alternative, the two light sources may be chromatic, but emitting different hues. For example, source 202a may supply magenta and cyan hues, while source 202b supplies yellow and blue hues. The camera 206 measures a plurality of color values, responsive to the plurality of monochromatic light sources. The geolocalization module 212 accesses the LUT 220 to cross-reference the plurality color values to a plurality of positions in the tracking area. Some positions in the tracking area are predominantly illuminated by source 202a (e.g. the first position), some positions are predominantly illuminated by source 202b (e.g., the second position), and some are illuminated by both sources (e.g., the third position). As shown, source 202a illuminates a first zone 300 (zone 1) of the tracking area 214, and the second light source 292b illuminates a second zone 302 (zone 2) of the tracking area.

For example, two illuminating sources of differing hues may be utilized to form a bi-chromatic hue gradient detectable by two different camera device color channels. Detection for each operates the same as before, but the transition region where the dominant hue at the entrance begins to roll off can be noted by the onset of the second hue signal. This condition may be used to, for example, to treat the falling first signal as an additive value to the previous signal, thus extending the useful range in addition to adding the second hue information.

Figure 4:
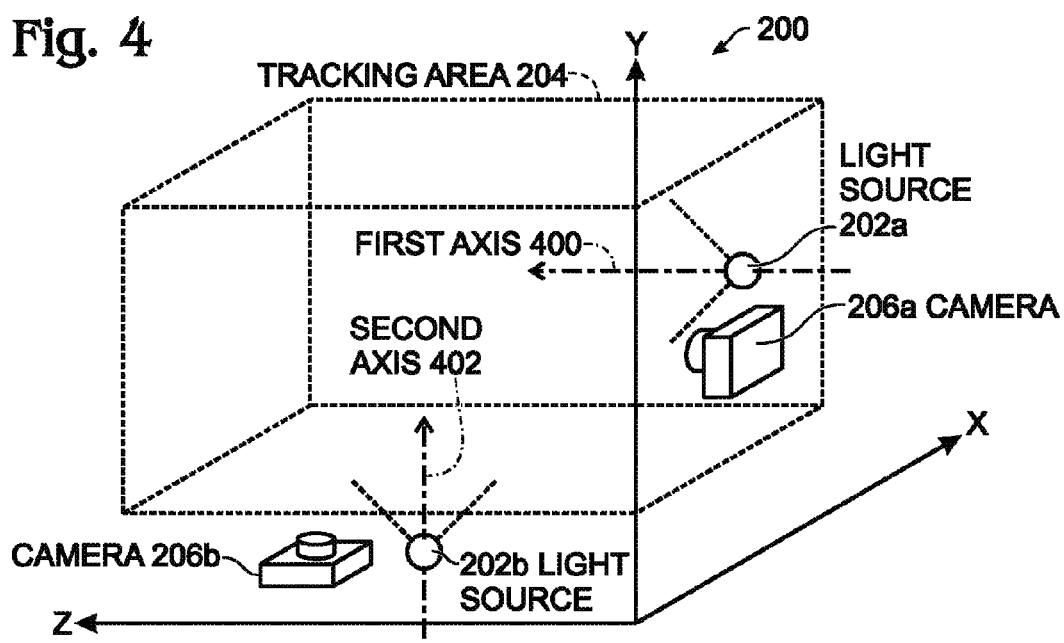
FIG. 4 is a schematic block diagram depicting a second variation of the color gradient object tracking system of FIG. 2.

FIG. 4 is a schematic block diagram depicting a second variation of the color gradient object tracking system of FIG. 2. In this aspect, a first light source 202a, chromatic or monochromatic, illuminates the tracking area 204 along a first axis 400, and a second light source 202b illuminates the tracking area 204 along a second axis 402, about orthogonal to the first axis 400. Although only two light sources are shown, this same concept can be extended to include additional light sources. Multiple lights sources may be used with a single camera, or as shown, with a plurality of cameras.

FIG. 5 is a schematic block diagram depicting a third variation of the color gradient object tracking system of FIG. 2. In this aspect, the first light source 202a, chromatic or monochromatic, is located at a first position and illuminates the tracking area along a first axis 500, and the second light source 202b is located at a second position, different from the first position, and illuminates the tracking area 204 along the second axis 502. Sources 202a and 202b are co-planar in the XY plane. Alternately, light source 202c may be used instead of 202b. Light source 202c has an axis of illumination 504 that is different than the first axis 500, and they are not co-planar (in the XY plane).

Figure 6:
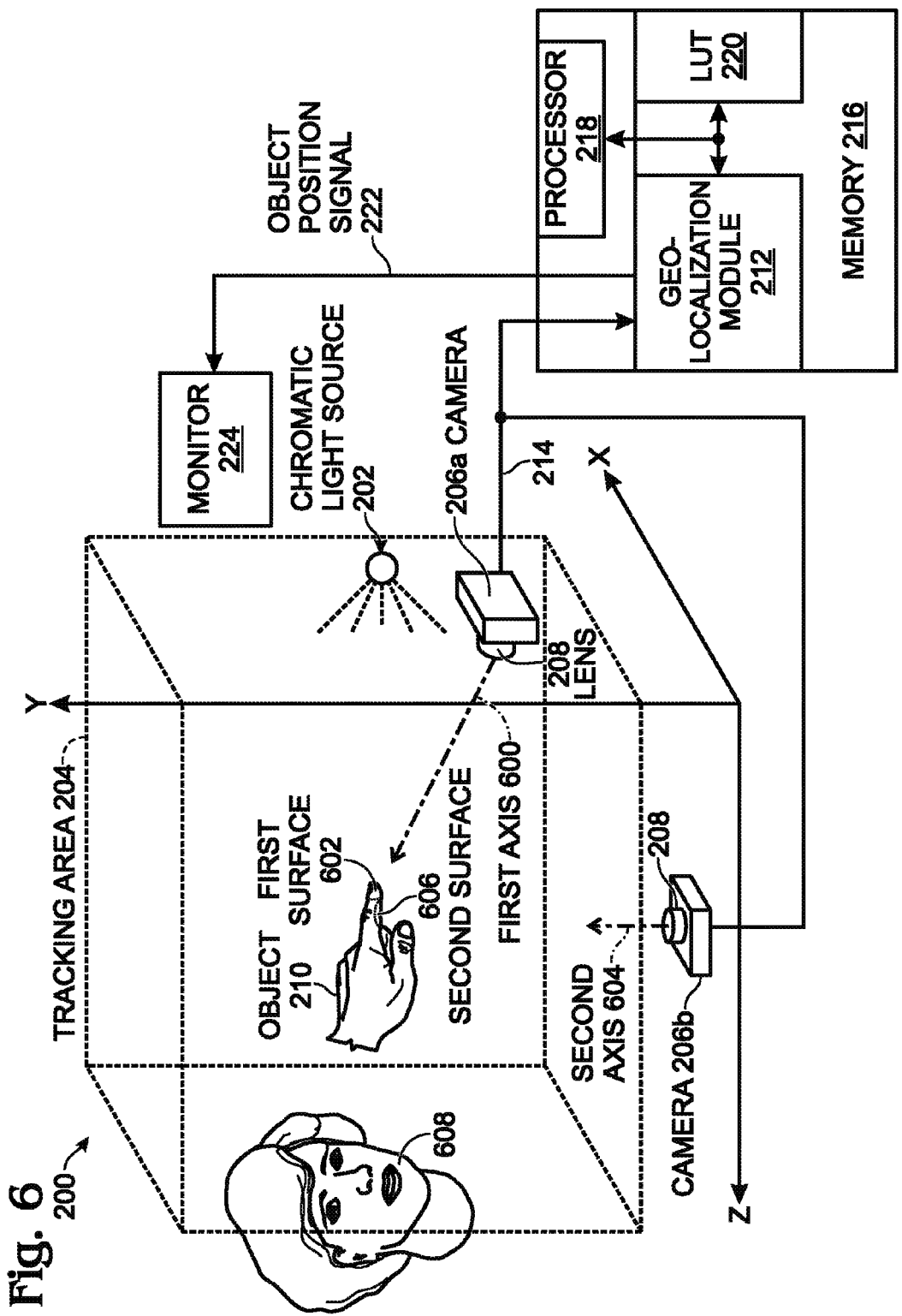
FIG. 6 is a schematic block diagram depicting a fourth variation of the color gradient object tracking system of FIG. 2.

FIG. 6 is a schematic block diagram depicting a fourth variation of the color gradient object tracking system of FIG. 2. In this aspect, a plurality of cameras 206 supply color value measurements. Shown are cameras 206a and 206b, but the system is not necessarily limited to the use of only two cameras. A first camera 206a has a lens 208 directed into the tracking area along a first axis 600 to measure a color value on a first surface 602 of the object 210. A second camera 206b has a lens 208 directed into the tracking area along a second axis 604 to measure a color value on a second surface 606 of the object. The geolocalization module 212 accesses the LUT 220 to cross-reference color values to object first and second surfaces 602/606 and determine the object shape. Although only a single light source is shown in the figure, the plurality of cameras may be used with a plurality of light sources, as explained in the description of FIGS. 3 through 5. In other aspects, color filters (not shown) may be interposed between the camera lenses and the tracking area, so that each camera is designed to predominantly sense a particular hue.

FIGS. 7A and 7B are schematic block diagrams depicting a fifth variation of the color gradient object tracking system of FIG. 2. In this aspect, the system 200 further comprises a hand-rest 700 with a transparent top dome 702. The top dome 702 has an external surface tracking area 704. The light source 202 is located inside the hand-rest 700 and illuminates the tracking area 704 through the top dome 702. A camera lens 208 (or camera 206 with lens) is located inside the hand-rest 700, with the lens 208 directed into the tracking area 704 through the top dome 702. Alternately but not shown, multiple light sources, multiple lenses, or a combination of multiple lenses and light sources may be used.

Alternately stated, a point light source 202 is directed outward through a clear spherical or hemispheric cover 702. An upward-viewing camera 206 or plurality of cameras captures objects, such as a hand, on the cover surface 704 and in the chromatically defined volume extending outward from the surface. Fine motion gestures, such as the lifting of a fingertip while the rest of the hand remains in contact with the cover, may be detected with better accuracy than in free space. The user's forearm may be supported to minimize fatigue.

Functional Description

Figure 8:
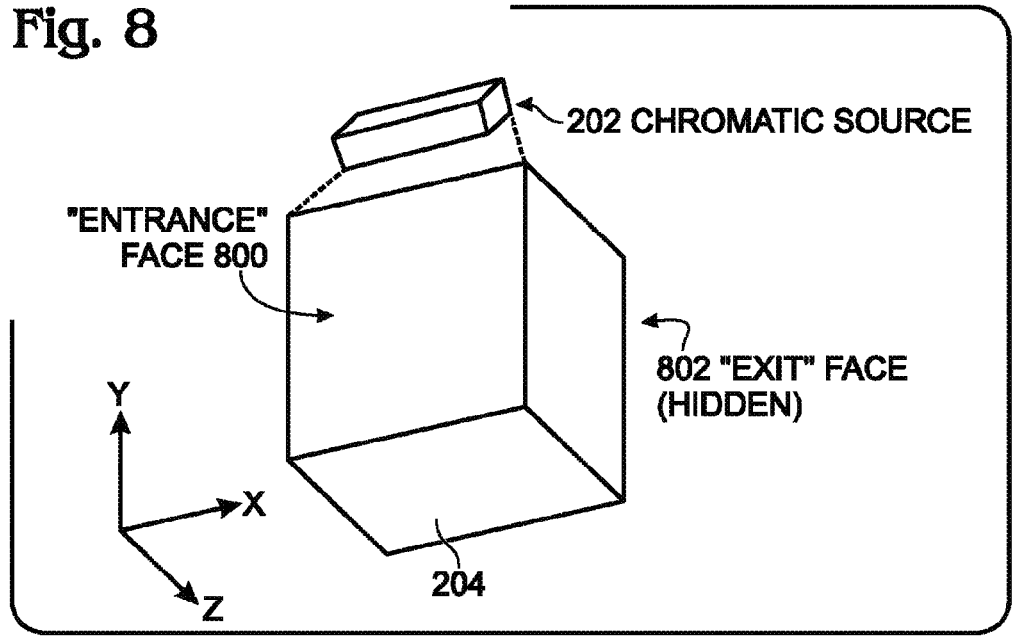
FIG. 8 is a diagram depicting the tracking area of FIGS. 2 through 6 from a different perspective.

FIG. 8 is a diagram depicting the tracking area of FIGS. 2 through 6 from a different perspective. In one aspect, the chromatic light source 202 illuminates a volume of space of about 0.5 cubic meters. Optionally, a second source, orthogonally positioned to the first, illuminates the same volume with a different hue. The source may be a point, line, or area source, which projects a geometric solid illumination field containing an illumination gradient. This gradient may be ordinary beam falloff or may be specifically controlled by optics and filtration. Chromaticity of broadband sources is established by filtration as visible colored light, preferably in bluish and reddish hues. Chromaticity of other sources may be established by mixtures of narrowband sources.

A face of the nominally cubic space so defined, orthogonal to both sources, is considered the entrance face 800. Opposite the entrance face (or exit) a digital color camera (not shown) is positioned to image the entire entrance and the volume section of the cube interior as allowed by the lens system of the camera. Optionally, a second such camera is positioned above the cube to image similarly from a nominally orthogonal above (or below) viewpoint. Optionally, monochrome cameras with filtration or color cameras with other than or more than red (R), green (G), and blue (B) channel responses may be used.

The illumination field is characterized in the camera view by imaging a reference diffuse reflectance target, with and without the illumination signal, at intervals along the axis (Z) from entrance 800 to exit 802. From these data a lookup table is generated to map the 3-dimensional illuminant gradient. This is used to create a monotonic scale for the Z-axis relating chromatic illuminance to position for illuminants and cameras.

Figure 9:
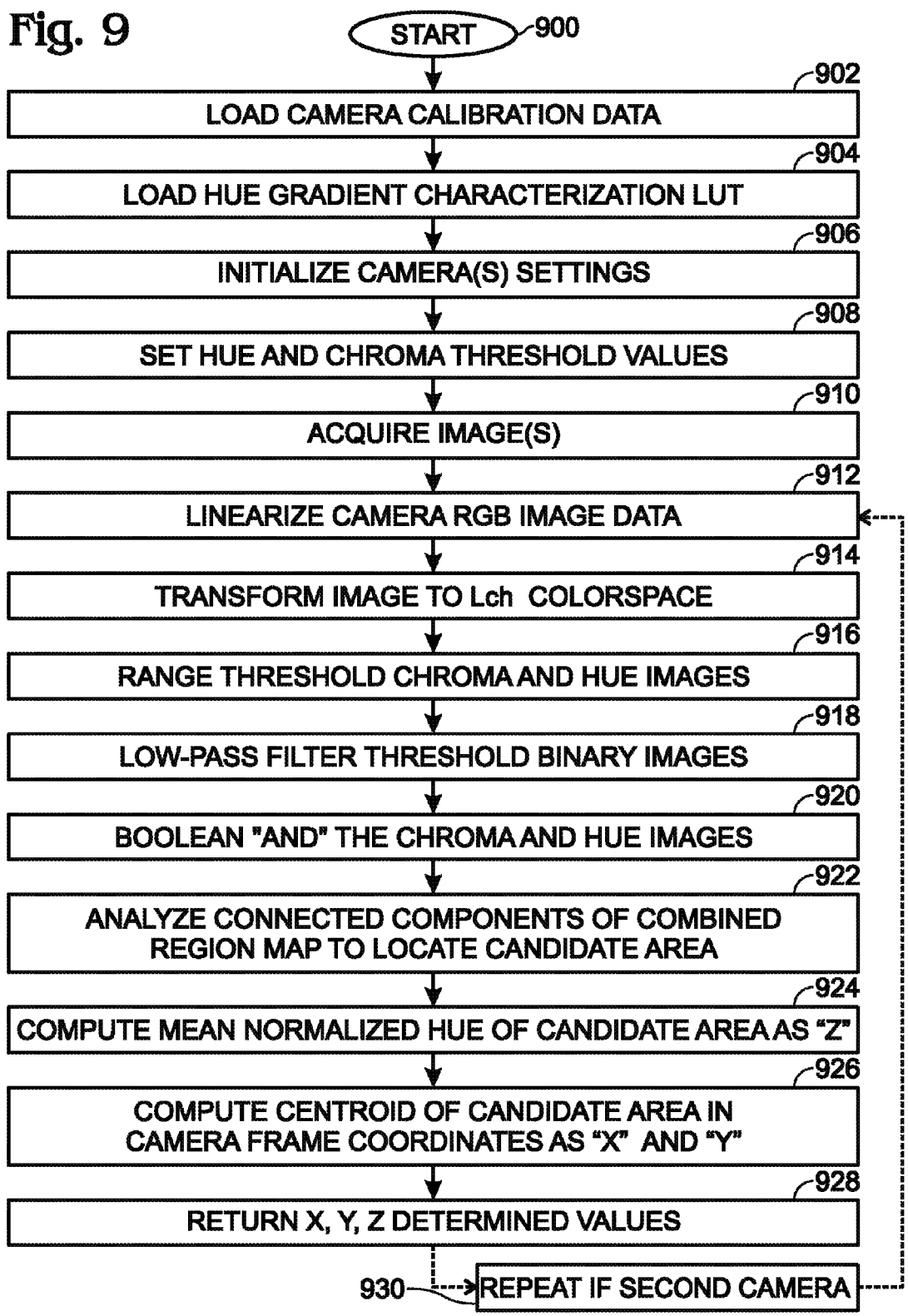
FIG. 9 is a flowchart illustrating a process for using the system of FIGS. 2-6 to track an object.

FIG. 9 is a flowchart illustrating a process for using the system of FIGS. 2-6 to track an object. In Step 902 the camera calibration data is loaded. In Step 904 the LUT is loaded. In Step 906 the camera settings are initialized. In Step 908 one or more color value attribute thresholds are set. In use, images are captured at regular intervals Step 910 and the camera RGB data is linearized in Step 912. In Step 914 data from the camera device colorspace is transformed into attributes such as luminance, chroma, and hue space (Lch). The Lch images are processed to segment the image into candidate object regions using a threshold range (Steps 916 and 918), and the chroma and hue channels are logically combined using a Boolean AND operation (Step 920) to meet candidate classification criteria. If the criteria are met, the classified regions are shape analyzed and a primary candidate used to determine X and Y position from the entrance-view image (Step 922). From the mean hue value of the candidate, and using the table previously described, a Z position value is determined (Step 924).

Across a sequence of images, velocity, and trajectory in 3 dimensions may be computed (Step 926 and 928). Not shown here, across images a change in X,Y,Z is noted to establish trajectory and the rate of change across the frame time establishes velocity. If a second viewpoint camera is used (Step 930), the corresponding image from the second camera is analyzed, and further feature correlation improves the 3-dimensional position estimation. Information derived for secondary, tertiary, and subsequent candidate regions may be used to enhance the computations or to contribute to a higher-complexity model of the object, e.g. extent, attitude, and feature orientations.

Alternately stated, the threshold chroma and hue images of Step 916 are binary spatial images generated by testing for values in a range in the respective continuous value images. The binary images are maps of the pixels (in the camera X-Y frame) that meet the test. Some of these values are noise and low-pass filtering removes some of that noise. The logical AND operation of 920 creates a single map of only pixels passing both the hue and chroma test. The connected component analysis in 922 also reduces noise by looking at additional criteria such as area and perimeter on which to select object candidates. In Step 924, the map points to the pixels in the continuous value hue image to use to compute a mean value of hue for that set of pixels. The mean hue value can be used as a Z-value directly. In Step 926 an X and Y position are determined for this object and Step 928 returns the three values. The X,Y,Z values of Step 928 are used as pointers into the 3D table, which returns where Z' has been calibrated to disambiguate a Z change from an X-Y change. X' and Y' can be identities, or preferably all are scaled to a spatial unit.

Using the classified candidate as a starting point, additional local image processing may take place to apply hand gesture recognition, other shape recognition, or similar scene information extraction processes.

Returning briefly to FIG. 6, the system 200 advantageously identifies the object 210 in the region of interest as a hand. A face 608 might also be detected by red channel flesh-tone detectors, is ignored, and computational steps to exclude it are avoided. Only objects entering the threshold-established hue volume are detected. Ambient objects which meet the criteria can be excluded by use of reference frame capture as part of a calibration prior to use.

In one aspect, the chromaticity of each illumination source present is adjusted in a calibration phase to maximize the spectral or effective RGB contrast of the desired detectable object as captured in the scene by the recording camera device. In another aspect, the user's hand or other object (e.g., pencil) is presented to the camera within the chromatically illuminated volume. A multi-chromatic LED light source and the camera channel gain settings are adjusted to maximize the hue signal for the introduced object. The chromaticity adjustment may be accomplished by dimming or brightening a specific emitter or emitters, or by manually or automatically manipulating a color filter either on the light source or the camera.

Figure 10:
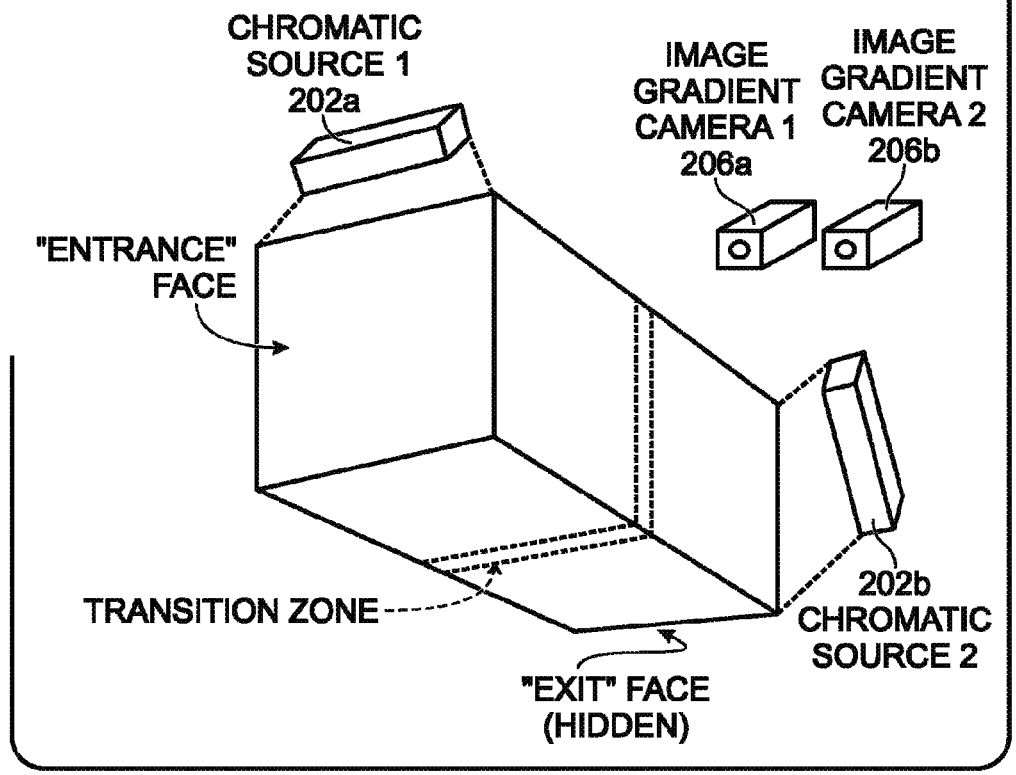
FIG. 10 is a schematic diagram depicting a gradient imager variation of the systems of FIG. 2-6.

FIG. 10 is a schematic diagram depicting a gradient imager variation of the systems of FIG. 2-6. A filtered monochromatic gradient—imaging camera can be used to measure the gradient value of an introduced chromatic illuminant. This could be 2-component vector, of magnitude and direction, or something more complex. For example, the magnitude can be a hue magnitude because the gradient imager is only looking at the hue of interest. In a multichannel/color gradient imager, the local gradients are captured for R,G,B—or for however many channels are detected. Color gradient imaging could also be done, which becomes a variant of computed gradients. The advantage of gradient imagers is a better dynamic range, making the tracking system more sensitive and robust at the same time.

In one aspect as shown, two illuminating sources of differing hues are utilized to form a bi-chromatic color gradient detectable by two different camera device color channels, or by two different monochromatic cameras (as shown) with band filtration for the two sources. In this aspect the camera imaging device is an image gradient camera, wherein the data output is not a static intensity image but an image comprised of vector components describing the local derivatives in two dimensions of the intensity function. Since the vector representation is a relative, not an absolute quantity, the extraction of an estimate for position in the third axis is accomplished by a size ratio of 2D correlated features across the two hue channels.

Figure 11:
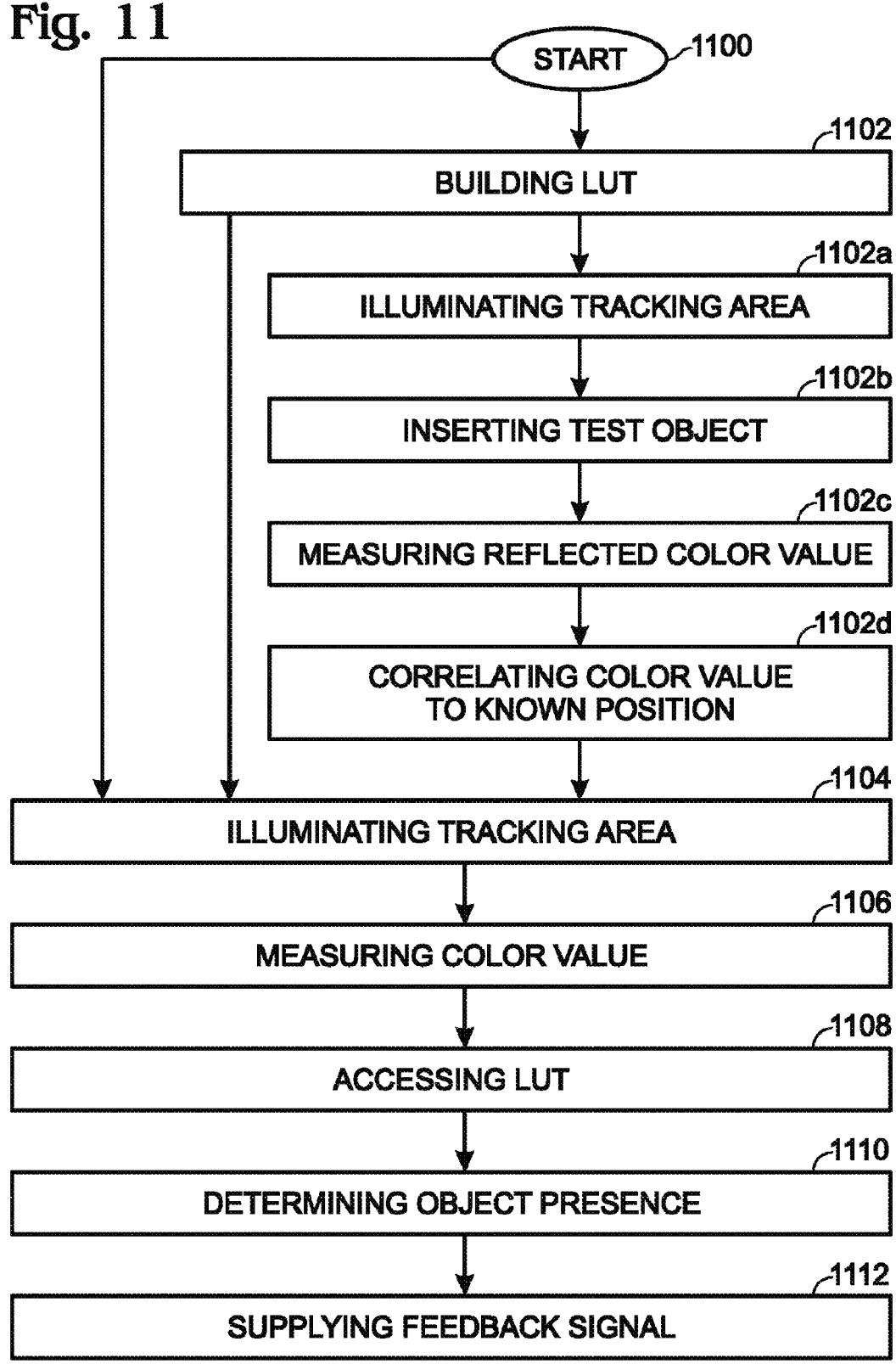
FIG. 11 is a flowchart illustrating a method for color gradient object tracking enabled as software instructions stored in a computer-readable medium and executable by a processor.

FIG. 11 is a flowchart illustrating a method for color gradient object tracking enabled as software instructions stored in a computer-readable medium and executable by a processor. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1100.

Step 1102 initially builds the LUT with the following substeps. Step 1102a illuminates the tracking area with the light source. Step 1102b inserts a test object into the tracking area in a plurality of known positions. Step 1102c measures a reflected color value at each known position. Step 1102d correlates color value measurements to known positions. Step 1104 illuminates a tracking area with a chromatic light source. Step 1106 measures a color value, defined by at least three attributes, reflected from an object in the tracking area. For example, color values are measured with a camera having a lens directed into the tracking area. Step 1108 accesses a LUT cross-referencing color values to positions in the tracking area. In response to accessing the LUT, Step 1110 determines a presence of the object in the tracking area. In response to determining the presence of the object in the tracking area, Step 1112 supplies a real-time feedback signal representing the object position.

In one aspect, Step 1106 measures a first color value at a first known position and a second color value at a second known position. Then determining the presence of the object in Step 1110 includes determining a color value gradient between the first and second known positions.

In another aspect, illuminating the tracking area with the chromatic light source in Step 1104 includes illuminating the tracking area with a plurality of monochromatic light sources. Then, measuring the color value in Step 1106 includes measuring a color value, defined by at least three attributes, reflected from the object in the tracking area in response to illumination from the plurality of light sources. For example, Step 1104 may illuminate a first zone of the tracking area with a first monochromatic light source, and illuminate a second zone of the tracking area with a second monochromatic light source (see FIG. 3). In one aspect, the first monochromatic light source is directed along a first axis and the second monochromatic light source is directed along a second axis, about orthogonal to the first axis (see FIG. 4). Regardless of whether the first and second axes are orthogonal or not, the first and second light sources may be located in positions that are co-planar or not co-planar with respect to each other (see FIG. 5).

In one aspect, measuring the color value in Step 1106 includes measuring a plurality of color values at a corresponding plurality of times and locations in the tracking area. Then, determining the presence of the object in Step 1110 additionally includes determining object characteristics such as object position, object shape, object trajectory, object velocity, and combinations of the above-mentioned characteristics.

In a related aspect, Step 1106 may measure the color value with a first camera having a lens directed into the tracking area along a first axis to measure a first surface of the object, and with a second camera having a lens directed into the tracking area along a second axis, to measure a second surface of the object. Accessing the LUT in Step 1108 includes accessing the LUT to cross-reference color values to object first and second surfaces, permitting the object shape, or other object characteristics to be determined in Step 1110. As described above, Step 1106 may measure the color value on a plurality of object surfaces using a plurality of cameras. Then, Step 1108 accesses the LUT to cross-reference color values to the plurality of object surfaces.

A system and method for color gradient object tracking has been provided. Explicit examples of measurements and equipment layouts have been given to illustrate the invention.

However, the invention is not limited to merely these examples. Other variations and embodiments of the invention will occur to those skilled in the art.

I claim:

1. In a computer system, a method for color gradient object tracking enabled as software instructions stored in a computer-readable medium and executable by a processor, the method comprising:

illuminating a tracking area with a chromatic light source;
   measuring a color value, defined by at least three attributes, reflected from an object in the tracking area;
   accessing a lookup table (LUT) cross-referencing color values to positions in the tracking area;
   in response to accessing the LUT, determining a presence of the object in the tracking area; and,
   in response to determining the presence of the object in the tracking area, supplying a real-time feedback signal representing the object position.

2. The method of claim 1 further comprising:

initially building the LUT as follows:
   illuminating the tracking area with the light source;
   inserting a test object into the tracking area in a plurality of known positions; and,
   measuring a reflected color value at each known position; and,
   correlating color value measurements to known positions.

3. The method of claim 2 wherein measuring the reflected color value at each known position includes measuring a first color value at a first known position and measuring a second color value at a second known position;
   wherein determining the presence of the object includes determining a color value gradient between the first known position and the second known position.

4. The method of claim 1 wherein illuminating the tracking area with the chromatic light source includes illuminating the tracking area with a plurality of monochromatic light sources; and,
   wherein measuring the color value includes measuring a color value, defined by at least three attributes, reflected from the object in the tracking area in response to illumination from the plurality of light sources.

5. The method of claim 4 wherein illuminating the tracking area with the plurality of monochromatic light sources includes illuminating the tracking area with a first monochromatic light source directed along a first axis, and illuminating the tracking area with a second monochromatic light source directed along a second axis, about orthogonal to the first axis.

6. The method of claim 4 wherein illuminating the tracking area with the plurality of monochromatic light sources includes illuminating the tracking area with a first monochromatic light source located at a first position and directed along a first axis, and illuminating the tracking area with a second monochromatic light source located at a second position, directed along the second axis, and wherein the first and second position are selected from a group consisting of co-planar and not co-planar.

7. The method of claim 1 wherein illuminating the tracking area with the chromatic light source includes illuminating a first zone of the tracking area with a first monochromatic light source, and illuminating a second zone of the tracking area with a second monochromatic light source.

8. The method of claim 1 wherein measuring the color value includes measuring a plurality of color values at corresponding object locations in the tracking area; and,
   wherein determining the presence of the object in the tracking area additionally includes determining object characteristics selected from a group consisting of object position, object shape, object trajectory, object velocity, and combinations of the above-mentioned characteristics.

9. The method of claim 1 wherein measuring the color value includes measuring the color value with a camera having a lens directed into the tracking area.

10. The method of claim 1 wherein measuring the color value includes measuring the color value with a first camera having a lens directed into the tracking area along a first axis to measure a first surface of the object, and a second camera having a lens directed into the tracking area along a second axis, to measure a second surface of the object;
    wherein accessing the LUT includes accessing the LUT to cross-reference color values to object first and second surfaces; and,
    wherein determining the presence of the object in, the tracking area additionally includes determining the object shape.

11. The method of claim 10 wherein measuring the color value includes measuring the color value on a plurality of object surfaces using a plurality of cameras; and,
    wherein accessing the LUT includes accessing the LUT to cross-reference color values to the plurality of object surfaces.

12. A system for color gradient object tracking, the system comprising:

a chromatic light source illuminating a tracking area;
    a camera with a lens directed into the tracking area to measure a color value, defined by at least three attributes, reflected from an object in the tracking area; and,
    a geolocalization module having an interface to receive color measurements from the camera, the geolocalization module accessing a lookup table (LUT) cross-referencing color values to positions in the tracking area, and in response to accessing the LUT, determining the presence of the object in the tracking area, the geolocalization module having an output to supply an object position real-time feedback signal representing the position of the object in the tracking area.

13. The system of claim 12 wherein the geolocalization module calibrates the LUT by illuminating the tracking area with the chromatic light source, accepting color measurements for a test object inserted into the tracking area in a plurality of determined positions, and correlating color value measurements to determined positions.

14. The system of claim 13 wherein the geolocalization module accepts a first color value measurement associated with a first known position, and a second color value measurement associated with a second known position, and determines a color value gradient between the first and second positions.

15. The system of claim 12 wherein the chromatic light source includes a plurality of monochromatic light sources, each directed into the tracking area;
    wherein the camera measures a plurality of color values, responsive to the plurality of monochromatic light sources; and,
    wherein the geolocalization module accesses the LUT to cross-reference the plurality color values to a plurality of positions in the tracking area.

16. The system of claim 15 wherein a first monochromatic light source illuminates the tracking area along a first axis, and a second monochromatic light source illuminates the tracking area along a second axis, about orthogonal to the first axis.

17. The system of claim 15 wherein a first monochromatic light source is located at a first position and illuminates the tracking area along a first axis, and a second monochromatic light source is located at a second position, and illuminates the tracking area along the second axis, and wherein the first and second positions are selected from a group consisting of co-planar and not co-planar.

18. The system of claim 12 wherein the chromatic light source includes a plurality of monochromatic light sources, including a first monochromatic light source illuminating a first zone of the tracking area, and a second monochromatic light source illuminating a second zone of the tracking area.

19. The system of claim 12 wherein the geolocalization module accepts a plurality of color value measurements at a corresponding plurality of times, and additionally determines object characteristics selected from a group consisting of object position, object shape, object trajectory, object velocity, and combinations of the above-mentioned characteristics.

20. The system of claim 12 further comprising:
a plurality of cameras to supply color value measurements;
wherein a first camera has a lens directed into the tracking area along a first axis to measure a color value on a first surface of the object, and a second camera has a lens directed into the tracking area along a second axis to measure a color value on a second surface of the object;
wherein the geolocalization module accesses the LUT to cross-reference color values to object first and second surfaces and determine an object shape.

21. The system of claim 12 further comprising:
a hand-rest with a transparent top dome, the top dome having an external surface tracking area;
wherein the light source is located inside the hand-rest and illuminates the tracking area through the top dome; and,
wherein the camera lens is located inside the hand-rest, with the lens directed into the tracking area through the top dome.

* * * * *